United States Patent
Ho et al.

(10) Patent No.: US 9,454,506 B2
(45) Date of Patent: Sep. 27, 2016

(54) MANAGING CACHE AT A COMPUTER

(71) Applicant: International Business Machines Corporation, Armonk, NY (US)

(72) Inventors: Wesley J. Ho, San Francisco, CA (US); Jeffrey K. Price, Austin, TX (US); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/686,554

(22) Filed: Nov. 27, 2012

(65) Prior Publication Data

US 2013/0086197 A1    Apr. 4, 2013

Related U.S. Application Data

(63) Continuation of application No. 12/434,100, filed on May 1, 2009, now abandoned.

(51) Int. Cl.

| | |
|---|---|
| *G06F 15/167* | (2006.01) |
| *G06F 17/30* | (2006.01) |
| *G06Q 10/00* | (2012.01) |
| *H04L 29/08* | (2006.01) |
| *H04L 12/58* | (2006.01) |
| *H04W 4/12* | (2009.01) |

(52) U.S. Cl.
CPC ....... *G06F 15/167* (2013.01); *G06F 17/30902* (2013.01); *G06Q 10/00* (2013.01); *H04L 51/18* (2013.01); *H04L 67/2847* (2013.01); *H04L 51/08* (2013.01); *H04W 4/12* (2013.01)

(58) Field of Classification Search
USPC ................ 709/217, 218, 219, 229
See application file for complete search history.

(56) References Cited

U.S. PATENT DOCUMENTS

| | | | |
|---|---|---|---|
| 5,790,793 A * | 8/1998 | Higley ................. | G06Q 10/107 707/E17.112 |
| 5,802,292 A | 9/1998 | Mogul | |
| 5,878,218 A | 3/1999 | Maddalozzo, Jr. et al. | |
| 5,887,151 A | 3/1999 | Raz et al. | |
| 5,961,602 A * | 10/1999 | Thompson ........ | G06F 17/30902 707/E17.12 |
| 6,292,835 B1 * | 9/2001 | Huang .............. | G06F 17/30902 707/999.201 |
| 6,385,641 B1 * | 5/2002 | Jiang ...................... | H04L 29/06 709/203 |
| 6,393,526 B1 | 5/2002 | Crow et al. | |
| 6,396,805 B2 * | 5/2002 | Romrell ................. | H04L 67/06 370/216 |

(Continued)

OTHER PUBLICATIONS

IBM, Method for Transmitting File Attachments to Shared Storage, IP.com Prior Art Database, IPCOM000173722D, Aug. 21, 2008 (5 pgs).

*Primary Examiner* — Backhean Tiv
(74) *Attorney, Agent, or Firm* — Schmeiser, Olsen & Watts, LLP; John Pivnichny

(57) ABSTRACT

A method and system for managing caching at a computer. A computer receives a file from a storage device on a network in response to a request by a first user. The computer may then determine if other users of the computer are likely to request the file, based upon a type of the file and a type of the network. If other users are likely to request the file, the computer may then cache the file at the computer. In one embodiment, the computer may determine if other users of the computer are likely to request the file based upon access permissions to the file at a source of the file. In another embodiment, the computer may determine if other users of the computer are likely to request the file based upon if the file has been previously cached at the computer.

12 Claims, 4 Drawing Sheets

(56) References Cited

U.S. PATENT DOCUMENTS

| | | | | |
|---|---|---|---|---|
| 6,477,529 B1* | 11/2002 | Mousseau | G06F 17/30905 | |
| 6,615,242 B1* | 9/2003 | Riemers | H04L 12/585 | 709/206 |
| 6,724,403 B1* | 4/2004 | Santoro | G09G 5/14 | 715/765 |
| 6,732,111 B2* | 5/2004 | Brodersen | G06F 17/30174 | |
| 6,813,633 B2* | 11/2004 | Wong | G06F 12/0811 | 709/217 |
| 6,892,221 B2* | 5/2005 | Ricart | G06F 11/1464 | 709/203 |
| 6,944,555 B2* | 9/2005 | Blackett | G06Q 50/06 | 702/57 |
| 6,959,318 B1* | 10/2005 | Tso | G06F 17/30902 | 707/E17.12 |
| 6,968,380 B1* | 11/2005 | Singhal | H04L 67/02 | 709/222 |
| 6,985,933 B1* | 1/2006 | Singhal | G06F 17/3087 | 707/E17.11 |
| 7,028,264 B2* | 4/2006 | Santoro | G06F 3/0481 | 715/729 |
| 7,130,890 B1* | 10/2006 | Kumar | H04L 67/2847 | 707/999.01 |
| 7,143,179 B2* | 11/2006 | Yaport | H04L 12/1859 | 709/223 |
| 7,194,514 B1* | 3/2007 | Yen | H04L 12/583 | 709/206 |
| 7,376,907 B2* | 5/2008 | Santoro | G06F 3/0481 | 715/729 |
| 7,389,330 B2* | 6/2008 | Dillon | G06F 17/30902 | 707/E17.12 |
| 7,472,129 B2* | 12/2008 | Adya | G06F 11/1482 | |
| 7,472,242 B1* | 12/2008 | Deshmukh | G06F 11/1451 | 711/162 |
| 7,499,996 B1* | 3/2009 | Buchheit | G06F 17/30902 | 709/203 |
| 7,536,442 B2* | 5/2009 | Kelley | G06Q 10/107 | 709/206 |
| 7,539,704 B2* | 5/2009 | Brodersen | G06F 17/30174 | |
| 7,552,220 B2* | 6/2009 | Marmigere | H04L 29/06 | 709/201 |
| 7,584,500 B2* | 9/2009 | Dillon | G06F 17/30902 | 713/151 |
| 7,665,131 B2* | 2/2010 | Goodman | G06Q 10/107 | 726/13 |
| 7,757,002 B2* | 7/2010 | Penton | G06F 17/30902 | 370/352 |
| 7,779,068 B2* | 8/2010 | Li | H04L 67/2847 | 709/203 |
| 7,882,189 B2* | 2/2011 | Wilson | H04L 12/58 | 379/93.01 |
| 7,912,899 B2* | 3/2011 | Beauchamp | G06Q 10/107 | 709/204 |
| 7,953,820 B2* | 5/2011 | Stevens | G06F 17/30902 | 709/219 |
| 7,958,457 B1* | 6/2011 | Brandenberg | G06F 1/1613 | 715/789 |
| 7,966,369 B1* | 6/2011 | Briere | G06Q 10/10 | 707/616 |
| 1,018,497 A1 | 7/2011 | Wilson et al. | | |
| 7,987,431 B2* | 7/2011 | Santoro | G06F 3/0481 | 715/729 |
| 8,005,891 B2* | 8/2011 | Knowles | G06F 17/30902 | 709/203 |
| 8,024,452 B2* | 9/2011 | Shenfield et al. | | 709/224 |
| 8,166,003 B2* | 4/2012 | Friesenhahn | G06F 17/30011 | 707/695 |
| 2001/0014103 A1* | 8/2001 | Burns | G06F 17/30902 | 370/429 |
| 2002/0062384 A1* | 5/2002 | Tso | H04L 29/06 | 709/229 |
| 2002/0188685 A1* | 12/2002 | Bhogal | H04L 29/06 | 709/206 |
| 2003/0055907 A1* | 3/2003 | Stiers | H04L 67/2804 | 709/206 |
| 2004/0068579 A1* | 4/2004 | Marmigere | H04L 29/06 | 709/242 |
| 2004/0167968 A1* | 8/2004 | Wilson | H04L 12/58 | 709/207 |
| 2005/0055569 A1* | 3/2005 | Shipp | G06Q 10/107 | 726/4 |
| 2005/0086307 A1* | 4/2005 | Kelley | H04L 51/26 | 709/206 |
| 2005/0239451 A1* | 10/2005 | Periyalwar | H04W 52/383 | 455/425 |
| 2006/0212757 A1* | 9/2006 | Ross | G06Q 10/10 | 714/34 |
| 2006/0235934 A1* | 10/2006 | Wilson | H04L 12/58 | 709/207 |
| 2006/0277271 A1* | 12/2006 | Morse | H04L 67/26 | 709/217 |
| 2006/0277308 A1* | 12/2006 | Morse | G06F 17/30867 | 709/227 |
| 2007/0143357 A1* | 6/2007 | Chaudhri | G06F 17/30017 | |
| 2007/0260829 A1* | 11/2007 | Hallivouri | G06F 3/0608 | 711/154 |
| 2007/0266095 A1* | 11/2007 | Billsus | G06Q 10/10 | 709/204 |
| 2007/0274489 A1* | 11/2007 | Yamamura | H04M 3/42365 | 379/201.1 |
| 2008/0005120 A1* | 1/2008 | Li | G06F 17/301 | |
| 2008/0010295 A1* | 1/2008 | Park | G06F 17/30017 | |
| 2008/0034294 A1* | 2/2008 | Ronkainen | G06F 1/1626 | 715/702 |
| 2008/0200161 A1* | 8/2008 | Morse | G06F 17/30867 | 455/418 |
| 2008/0279200 A1* | 11/2008 | Shatzkamer | H04L 63/0892 | 370/401 |
| 2008/0288303 A1* | 11/2008 | Gray | G06Q 30/0185 | 705/7.29 |
| 2009/0077182 A1* | 3/2009 | Banjara | H04L 51/34 | 709/206 |
| 2009/0144380 A1* | 6/2009 | Kallman | G06Q 10/107 | 709/206 |
| 2009/0187581 A1* | 7/2009 | Delisle | G06F 17/3012 | |
| 2009/0248636 A1* | 10/2009 | Gangemi | G06F 8/60 | |
| 2009/0327849 A1* | 12/2009 | Kavanagh | G06Q 10/107 | 715/205 |
| 2010/0049746 A1* | 2/2010 | Aebig | G06Q 10/10 | 705/7.41 |
| 2010/0106786 A1* | 4/2010 | Horstmann | G06Q 10/107 | 709/206 |
| 2010/0161756 A1* | 6/2010 | Lewis | H04N 7/17318 | 709/217 |
| 2010/0210244 A1* | 8/2010 | Andreasson | H04L 51/18 | 455/412.1 |
| 2010/0235472 A1* | 9/2010 | Sood | H04L 65/4092 | 709/219 |
| 2010/0281224 A1* | 11/2010 | Ho | G06F 17/30902 | 711/137 |
| 2011/0184976 A1* | 7/2011 | Wilson | H04L 12/58 | 707/769 |
| 2011/0213800 A1* | 9/2011 | Saros | G06Q 30/02 | 707/769 |

* cited by examiner

MANAGING CACHE AT A COMPUTER

CROSS REFERENCE TO RELATED APPLICATIONS

This is a continuation of the invention described in U.S. patent application Ser. No. 12/434,100, filed May 1, 2009, now abandoned, by the same inventors herein, titled "PREFETCHING CONTENT FROM INCOMING MESSAGES." The invention described in U.S. patent application Ser. No. 12/434,100 is assigned to the assignee hereof.

BACKGROUND OF THE INVENTION

The present invention relates in general to computer systems, and in particular to electronic messaging systems. Still more particularly, the present invention relates to a system for prefetching content from incoming messages.

Computer users often receive email, instant messages, and other message types which links to remotely stored content. The referenced content may include large files to download, new articles, and multimedia content, for example. In one instance, senders may transmit large files by storing the files on a network server and sending a resource link in an email or instant message to bypass size constraints on email and instant message sizes.

After eventually clicking a resource links, users may be required to wait for a considerable amount of time while the actual content downloads. This is especially true if the user is mobile and connecting via a wireless connection with limited bandwidth and/or a slower connection speed. Additionally, a same resource link may be sent to multiple users with each user selecting to download a same content. This wastes bandwidth as several computers are simultaneously downloading the same content from a remote location. Furthermore, if the user is processing electronic mail while in a disconnected mode, the referenced content may not be available at all.

SUMMARY

Disclosed is a method and system for managing caching at a computer. A computer receives a file from a storage device on a network in response to a request by a first user. The computer may then determine if other users of the computer are likely to request the file, based upon a type of the file and a type of the network. If other users are likely to request the file, the computer may then cache the file at the computer. If not, the computer may not cache the file at the computer.

In accordance with another aspect of the disclosure, a computer receives a file from a storage device on a network in response to a request by a first user. The computer may then determine whether to cache the file based upon access permissions to the file.

The above as well as additional objectives, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION

The illustrative embodiments provide a method, system, and computer program product for prefetching content linked in an incoming message.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
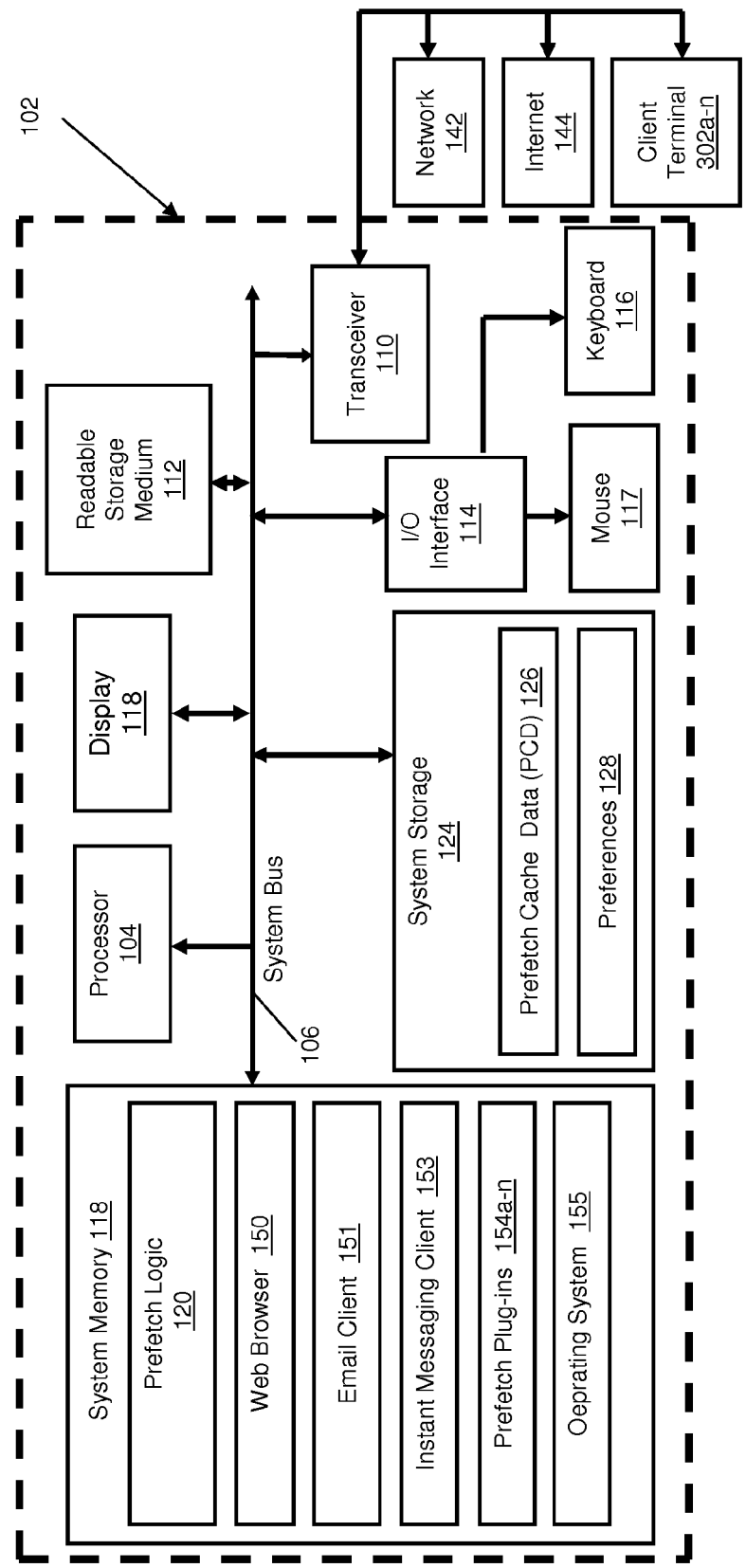
FIG. 1 is a block diagram of a computing device in which the present invention may be implemented.

With reference now to FIG. 1, there is depicted a block diagram of a computing device in which the present invention may be implemented. Computer 102 includes a processor 104 that is coupled to a system bus 106. A transceiver 110, connected to system bus 106, enables Computer 102 to connect to network 142, an internet 144, and client terminals 302a-n via wired or wireless mechanisms. System bus 106 also affords communication with a hardware-based readable storage medium 112 (e.g., Compact Disk-Read Only Memory (CD-ROM), flash drive memory, etc). Input/Output (I/O) Interface 114, also connected to system bus 106, permits user interaction with Computer 102, such as data entry via keyboard 116 or Mouse 117. Display 118 enables the viewing of content and a general user interface (including text and graphics) for use by a user of Computer 102.

Computer 102 also comprises system storage 124, which is connected to system bus 106. System Storage 124 comprises prefetch cache data 126 and preferences 128. Preferences 128 may contain prefetch history information and user defined preferences for prefetching content linked in an incoming message.

Computer 102 also comprises system memory 118, which is connected to system bus 106. As shown, system memory 118 also comprises prefetch logic 120, web browser 150, email client 151, instant messaging client 153, prefetch plug-ins 154a-n, and operating system 155. Prefetch logic 120 includes code for implementing the processes described in FIGS. 2-5. In one embodiment, Prefetch logic 120 may directly integrate with email client 151 and instant messaging client 153 by an installed prefetch plug-in 154a-n. In an alternate embodiment, prefetch logic 120 may be integrated at an operating system level. In one embodiment, Computer 102 is able to utilize prefetch logic 120 to prefetch resource link content of an incoming message, as described in greater detail below in FIGS. 2-4.

As illustrated and described herein, Computer 102 may be any computing device having the required hardware components and programmed with prefetch logic 120, executing on the processor to provide the functionality of the invention. The hardware elements depicted in Computer 102 are not intended to be exhaustive, but rather are representative to highlight essential components required by and/or utilized to implement the present invention. For instance, Computer 102 may include alternate memory storage devices such as magnetic cassettes, Digital Versatile Disks (DVDs), Bernoulli cartridges, and the like. These alternate configurations of components and other variations are intended to be within the spirit and scope of the present invention.

Figure 2:
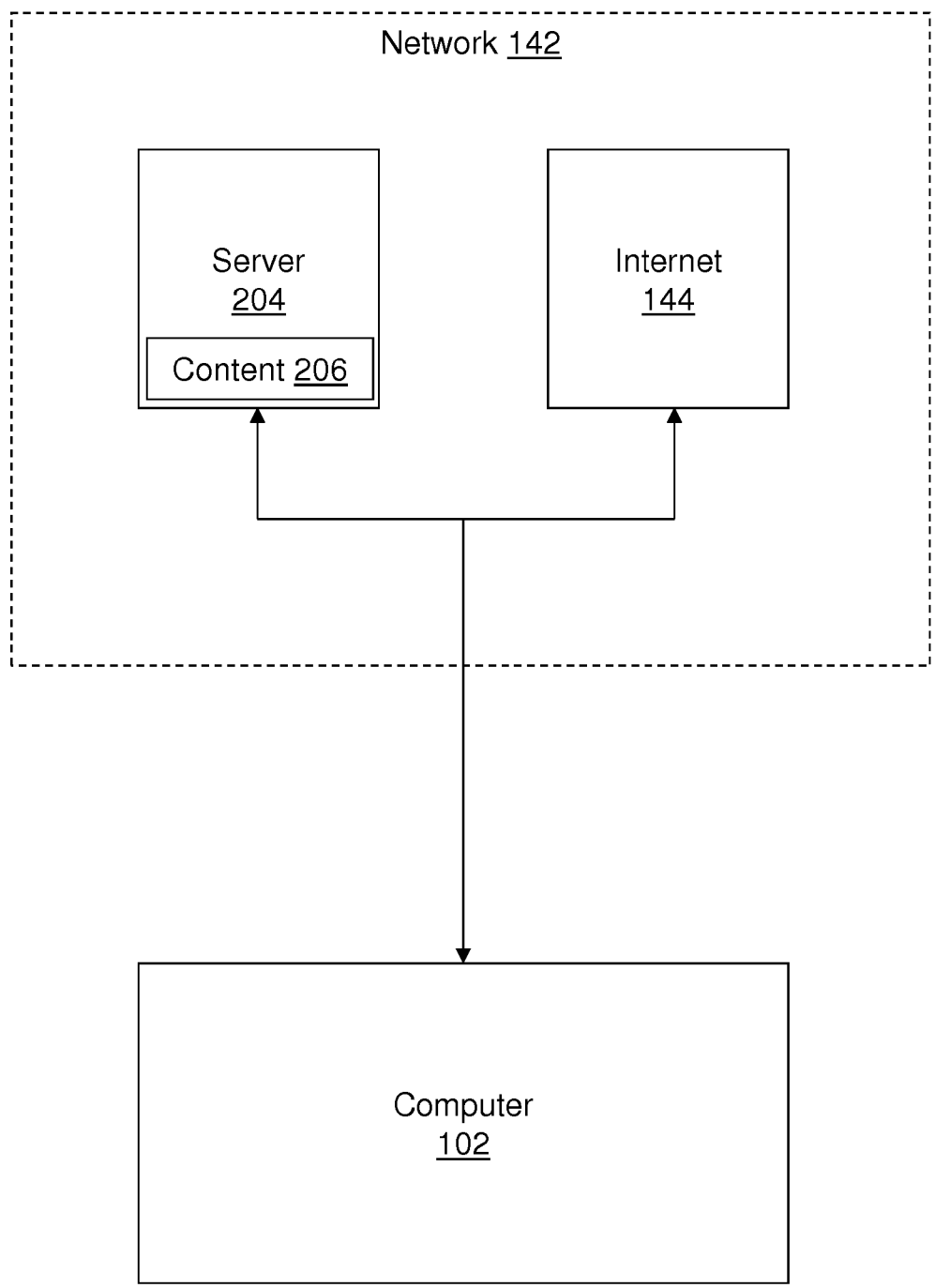
FIG. 2 is a block diagram of an exemplary system for prefetching content from incoming messages on a computer.

With reference now to FIG. 2, there is illustrated an exemplary system for prefetching resource link content of an incoming message, in accordance with one embodiment of the invention. The illustrative embodiment is described from the perspective of Computer 102 receiving an incoming message and subsequently prefetching content 206 linked in the incoming message. An incoming message may be any message, such as an email, instant message, system notification, etc. A resource link may be any link to content, such as a Uniform Resource Locator (URL). Upon receiving an incoming message, prefetch logic 120 scans the incoming message for resource links.

When resource links are detected, the prefetch logic 120 determines if the resource links are likely to be accessed by a user of Computer 102, by referencing locally stored preferences (e.g., preferences 128, FIG. 1) and by determining relevance of each resource link target. For example, prefetch logic 120 may determine if a destination of a resource link points to relevant files, or if the resource link is merely pointing to a corporate website (e.g., a resource link in a sender's email signature). Prefetch logic 120 may also consider other factors (autonomously, or by accessing stored preferences or data), such as historical access data, time of day, connectivity to a preferred network, system resources, user resources, access permissions, and the linked content of a specific resource link to determine the probability of access of that specific resource link. Additionally, the locally stored preferences may indicate only to prefetch a resource link target pointing to a specific file type. In an alternate embodiment, prefetch logic 120 may reference past prefetch history to determine if a resource link has been clicked before.

After determining that a target of a received resource link is likely to be accessed by a user of Computer 102, prefetch logic 120 checks a prefetch cache data (e.g., prefetch cache data 126) to determine if the target of the resource link has been previously cached. Additionally when existing prefetch cache data of the target of the resource link has been detected, prefetch logic 120 may compare the stored prefetch cache data with the target of the resource link to determine if the stored prefetch cache data is current. In one embodiment, prefetch logic may compare characteristics (e.g. file size, checksum, date stamp) of the target of a resource link with the stored cache data to determine if the cache data is current. When the prefetch cache data is not current or prefetch cache data is not detected for the target, the target of the resource link may be prefetched by prefect logic 120 into system storage (e.g., system storage 124). Prefetched cache data may be stored locally on Computer 102, or, in an alternate embodiment, on a proxy server with local access or a network drive, and may include, files, multimedia content. In the main embodiment, prefetched data may be immediately downloaded to Computer 102 when a suitable network connection is available. In this manner, the prefetch data may then be accessed when the computer is not connected to the network from which the data is downloaded (e.g., network 142). Upon detecting that a user has requested access to the target of the resource link, prefetch logic 120 provides the cached content to the user.

In an alternate embodiment prefetched content stored on a local storage may be provided when a computer is functioning in an offline mode (without a network connection). In this manner prefetched content in available for access on Computer 102 when the user is offline. In on example, this may facilitate a user accessing an attachment file of an email that was previously received by Computer 102 but was not accessed until after Computer 102 was already in an offline mode.

Figure 3:
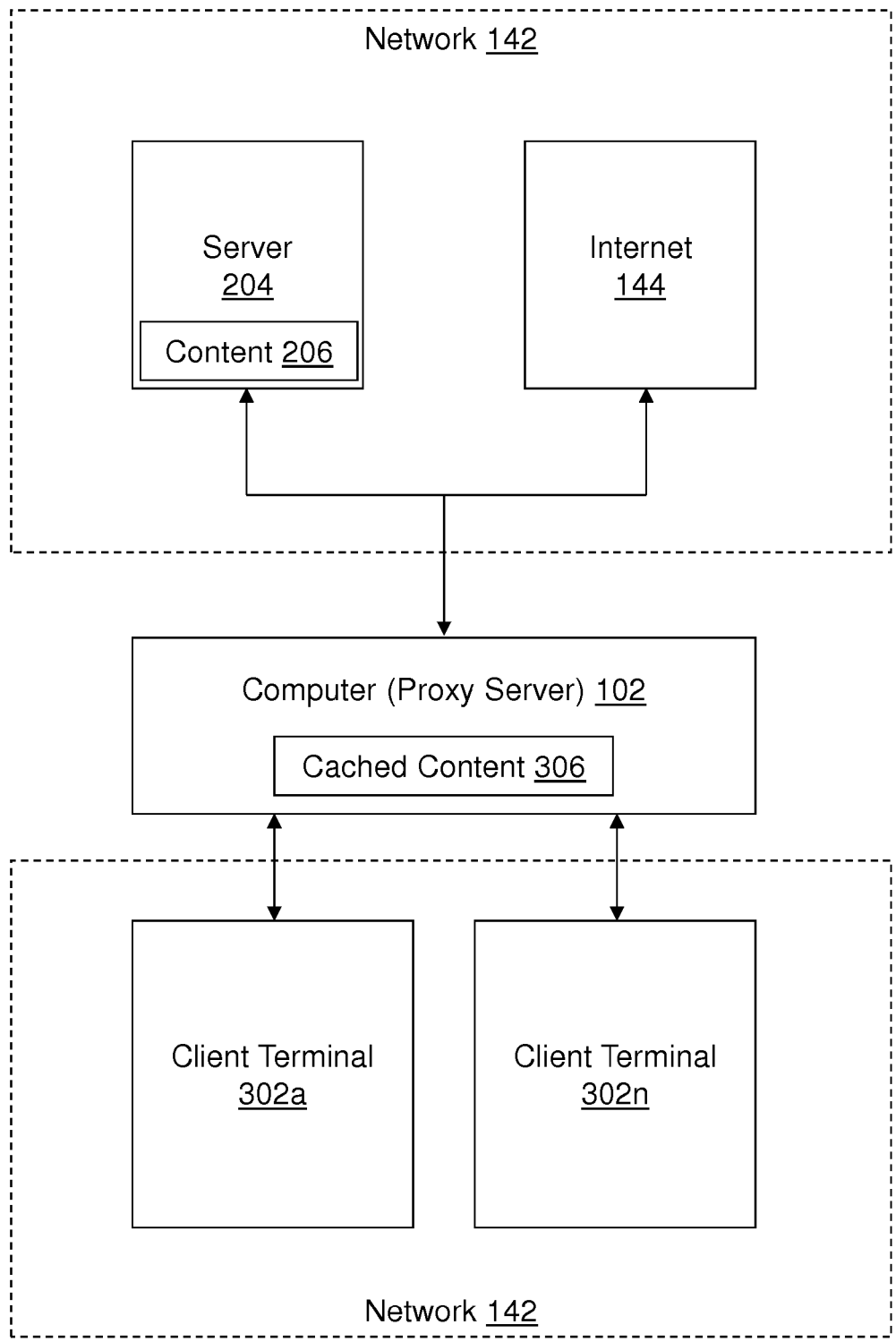
FIG. 3 is a diagram of an exemplary system for prefetching content from incoming messages on a proxy server.

With reference now to FIG. 3, there is illustrated an exemplary system for prefetching content from incoming messages from a proxy server. In this embodiment, Computer 102 is functioning as a proxy server connected to one or more client terminals 302a-n. Incoming messages are scanned by prefetch logic 120 of Computer 102 for resource links before delivering the incoming messages to an intended Client Terminal 302a-n. In this embodiment the target data of a resource link is stored as cached content 306 on Computer 102 and may be served to Client Terminals 302a-n upon request. This method facilitates more efficient use of a network connection by only downloading a target data of a resource link once instead of once each time a link is clicked by a user. For example, an email sent to a department of 10 persons contained a link to a spreadsheet file stored on a corporate web site that each member of the department requires to complete a daily task. Rather than individually allow each department member to download the content 206 from the corporate website upon each click, Computer 102 pre-caches the file initially, and serves the cached content 306 each client terminal 302a-n upon request instead of allowing each client terminal 302a-n to download the cached content from a content provider (not pictured).

Figure 4:
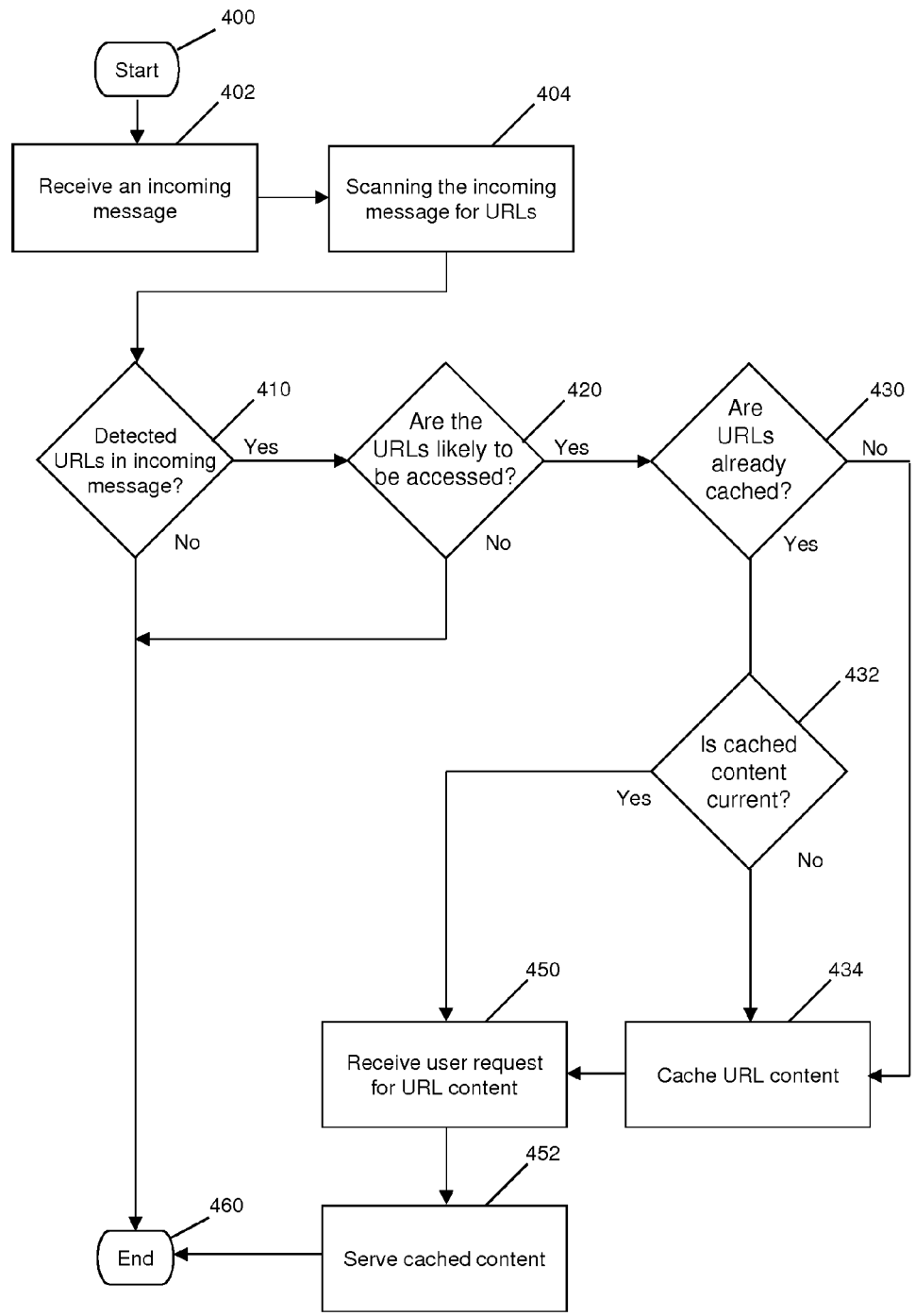
FIG. 4 is a high-level logical flowchart of an exemplary method for prefetching content from incoming messages.

With reference now to FIG. 4, there is provided a high-level flow chart of an exemplary method for prefetching content from incoming messages. At block 402, the computer receives an incoming message. At block 404 the prefetch logic (of the computer) scans the incoming message for resource links. In response to detecting resource links in the incoming message (block 410), the computer then determines the likelihood that each detected resource link is accessed (block 420). When the computer determines that the resource links are not likely to be accessed, or that the incoming message does not contain resource links, the process terminates (block 460).

Upon determining that one or more resource links of the incoming message are likely to be accessed, the computer determines if the target of each of the resource links determined likely to be accessed has already been cached (block 430). In the event that the target of a resource link has not previously been cached, the target of the resource link is downloaded and locally cached on the computer (block 434).

When the computer determines that the target of a resource link has been cached, the computer determines if the cached data is current by comparing the cached data with the target data of the resource link (block 432). When the cached data is not current, Computer 102 locally downloads the target of the resource link to a local storage (block 434).

Upon receiving a request from a user to access the target of the resource link (block 450), the computer serves the cached content to the user (block 452). The process then ends at terminator block 460.

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. For example, the user or users described herein may be application programs. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for prefetching content from incoming messages and managing caching at a computer, said method comprising:

scanning, by a processor of the computer, an incoming message;

detecting, by the processor, one or more resource links in the scanned incoming message;

in response to said detecting the one or more resource links in the scanned incoming message, determining, by the processor, that users of the computer are likely to request a content of the detected one or more resource links, said determining, that the users are likely to request the content of the detected one or more resource links, being based at least on a type of the one or more detected resource links and a type of network to which the computer is connected;

in response to said determining that users of the computer are likely to request a content of the detected one or more resource links, ascertaining, by the processor, whether or not the content of the one or more resource links has been previously cached at the computer as a previously cached content of the one or more resource links;

if said ascertaining ascertains that the content of the one or more resource links has not been previously cached at the computer, then in response to said ascertaining, caching, at the computer by the processor, the content of the detected one or more resource links;

if said ascertaining ascertains that the content of the one or more resource links has been previously cached at the computer, then in response to said ascertaining, said processor making a determination of whether or not the previously cached content of the one or more resource links is current relative to the content of the detected one or more resource links;

if said determination is that the previously cached content of the one or more resource links is not current relative to the content of the detected one or more resource links, then in response to said determination, caching, at the computer by the processor, the content of the detected one or more resource links; and if said determination is that the previously cached content of the one or more resource links is current relative to the content of the detected one or more resource links, then in response to said determination, not caching, at the computer by the processor, the content of the detected one or more resource links, wherein the incoming message is an email message sent by a sender, and wherein the one or more resource links are in the sender's email signature in the email message, and wherein said determining that users of the computer are likely to request the content of the detected one or more resource links is further based on determining that the detected one or more resource links are pointing to one or more files and are not pointing to a corporate website.

2. The method of claim 1, wherein said determining that users of the computer are likely to request the content of the one of more resource links is further based on access permissions to the one or more resource links at a source of the one of more resource links.

3. The method of claim 1, wherein said making a determination of whether the previously cached content of the one or more resource links is current relative to the content of the detected one or more resource links comprises determining a characteristic of the detected one or more resource links, said characteristic being selected from the group consisting of file size, checksum, and date stamp.

4. The method of claim 1, wherein said determining that users of the computer are likely to request the content of the detected one or more resource links is further based on a preference, stored at the computer, that one resource link of the detected one or more resource links was clicked on before said scanning.

5. The method of claim 1, said method further comprising:
receiving a specification of a preferred network, wherein said determining that users of the computer are likely to request the content of the detected one or more resource links is further based on connectivity to the specified preferred network.

6. The method of claim 1, wherein the one or more resource links comprise a specific resource link, and wherein said determining that users of the computer are likely to request the content of the detected one or more resource links is further based on determining, from the content of the specific resource link, a probability of access of the specific resource link.

7. A system comprising: a computer, a processor, a memory coupled to the processor, a computer readable hardware storage device coupled to the processor; and program instructions stored on the storage device, said computer comprising the processor and the memory, said program instructions, upon being executed by the processor via the memory, perform a method for prefetching content from incoming messages and managing caching at the computer, said method comprising:
scanning, by the processor, an incoming message;
detecting, by the processor, one or more resource links in the scanned incoming message;
in response to said detecting the one or more resource links in the scanned incoming message, determining, by the processor, that users of the computer are likely to request a content of the detected one or more resource links, said determining being based at least on a type of the one or more detected resource links and a type of network to which the computer is connected;
in response to said determining that users of the computer are likely to request a content of the detected one or more resource links, ascertaining, by the processor, whether or not the content of the one or more resource links has been previously cached at the computer as a previously cached content of the one or more resource links;
if said ascertaining ascertains that the content of the one or more resource links has not been previously cached at the computer, then caching, at the computer by the processor, the content of the detected one or more resource links;
if said ascertaining ascertains that the content of the one or more resource links has been previously cached at the computer, then said processor making a determination of whether or not the previously cached content of the one or more resource links is current relative to the content of the detected one or more resource links;
if said determination is that the previously cached content of the one or more resource links is not current relative to the content of the detected one or more resource links, then caching, at the computer by the processor, the content of the detected one or more resource links; and
if said determination is that the previously cached content of the one or more resource links is current relative to the content of the detected one or more resource links, then not caching, at the computer by the processor, the content of the detected one or more resource links,
wherein the incoming message is an email message sent by a sender, and wherein the one or more resource links are in the sender's email signature in the email message, and
wherein said determining that users of the computer are likely to request the content of the detected one or more resource links is further based on determining that the detected one or more resource links are pointing to one or more files and are not pointing to a corporate website.

8. The system of claim 7, wherein said determining that users of the computer are likely to request the content of the one of more resource links is further based on access permissions to the one or more resource links at a source of the one of more resource links.

9. The system of claim 7, wherein said making a determination of whether the previously cached content of the one or more resource links is current relative to the content of the detected one or more resource links comprises determining a characteristic of the detected one or more resource links, said characteristic being selected from the group consisting of file size, checksum, and date stamp.

10. The system of claim 7, wherein said determining that users of the computer are likely to request the content of the detected one or more resource links is further based on a preference, stored at the computer, that one resource link of the detected one or more resource links was clicked on before said scanning.

11. The system of claim 7, said method further comprising:
receiving a specification of a preferred network, wherein said determining that users of the computer are likely to request the content of the detected one or more resource links is further based on connectivity to the specified preferred network.

12. The system of claim 7, wherein the one or more resource links comprise a specific resource link, and wherein said determining that users of the computer are likely to request the content of the detected one or more resource links is further based on determining, from the content of the specific resource link, a probability of access of the specific resource link.

* * * * *